United States Patent [19]

Hedberg et al.

[11] Patent Number: 5,484,978
[45] Date of Patent: Jan. 16, 1996

[54] DESTRUCTION OF HYDROCARBON MATERIALS

[75] Inventors: Goran J. Hedberg, Norwich, Vt.; Ellen E. Knights, Lyme, N.H.

[73] Assignee: Energy Reclamation, Inc., Lyme, N.H.

[21] Appl. No.: 209,977

[22] Filed: Mar. 11, 1994

[51] Int. Cl.[6] .............................. B23K 10/00; C09C 1/48; F23G 7/04
[52] U.S. Cl. .................. 219/121.59; 219/121.43; 219/121.36; 219/121.51; 110/346; 110/238; 588/210; 588/212; 588/900
[58] Field of Search .................. 215/121.43, 121.36, 215/121.51, 121.37, 121.38, 121.59; 110/240–246, 346, 229, 237, 238, 254; 588/205, 210, 900, 212

[56] References Cited

U.S. PATENT DOCUMENTS

| | | | |
|---|---|---|---|
| 2,926,073 | 2/1960 | Robinson et al. | 23/259.5 |
| 4,042,334 | 8/1977 | Matovich | 23/252 R |
| 4,056,602 | 11/1977 | Metovich | 423/345 |
| 4,438,706 | 3/1984 | Boday et al. | |
| 4,479,443 | 10/1984 | Faldt et al. | |
| 4,509,434 | 4/1985 | Boday et al. | 110/238 |
| 4,615,285 | 10/1986 | Bentell et al. | 110/346 |
| 4,635,573 | 1/1987 | Santen | 110/346 |
| 4,644,877 | 2/1987 | Barton et al. | |
| 4,690,743 | 9/1987 | Ethington et al. | 204/168 |
| 4,770,109 | 9/1988 | Schlienger | |
| 4,934,286 | 6/1990 | Fowler | 110/346 |
| 4,978,477 | 12/1990 | Larsen et al. | 252/626 |
| 5,280,757 | 1/1994 | Carter et al. | 110/346 |
| 5,319,176 | 6/1994 | Alvi et al. | 219/121.59 |

FOREIGN PATENT DOCUMENTS

| | | |
|---|---|---|
| 9312031 | 6/1993 | WIPO. |
| 9312030 | 6/1993 | WIPO. |
| 9320153 | 10/1993 | WIPO. |
| 9320151 | 10/1993 | WIPO. |
| 9320154 | 10/1993 | WIPO. |
| 9320152 | 10/1993 | WIPO. |
| 9414899 | 7/1994 | WIPO. |

*Primary Examiner*—Mark H. Paschall
*Attorney, Agent, or Firm*—Henry D. Pahl, Jr.

[57] ABSTRACT

In the method of destroying hydrocarbons disclosed herein, a high temperature plasma is generated from an electrical discharge in a flow of hydrogen gas devoid of oxygen. The hydrocarbon to be destroyed is injected into the plasma thereby to decompose the hydrocarbon and produce an increased amount of hydrogen gas and also carbon particles. The carbon is then separated from the flow and at least a portion of the increased hydrogen is combined or combusted with atmospheric oxygen to generate electric current. That current is then applied to generate the plasma. Another portion of the hydrogen gas is fed back to feed the plasma generation. For hydrocarbon materials containing chlorine, the discharge flow is passed through an alkaline scrubber. An advantage of the method is that it produes carbon of exceptional purity which has significant commercial uses.

11 Claims, 3 Drawing Sheets

DESTRUCTION OF HYDROCARBON MATERIALS

BACKGROUND OF THE INVENTION

The present invention relates to a method for the pyrolytic destruction of hydrocarbon based materials and, more particularly, to such a method which does not consume substantial power from an external source.

As is understood, many wastes presently considered to be hazardous are hydrocarbon based. Many of these wastes are petroleum products, e.g., motor oil, and some of the wastes regarded as more dangerous contain PCBs (polychlorinatedbiphenyls). Certain transformer oils are of this type. Conventional methods of destroying such wastes typically involve incineration in the presence of air or high temperature decomposition, e.g., in a kiln or by the application of heat from a conventional plasma torch. In the case of the kiln, however, it has been difficult to establish a geometry which will insure a complete destruction of the hazardous material since transient paths of cool temperature may arise and allow some material to transit the kiln without experiencing sufficiently high temperature for sufficiently long time. While the use of a conventional plasma torch provides a better assurance of complete disassociation of the waste product, the energy requirements and the plasma gas requirements have been so high that the process has not been commercially feasible. Further, some of the byproducts may be undesirable.

Among the several objects of the present invention may be noted the provision of an novel method and apparatus for destroying hydrocarbon based materials; the provision of such a method and apparatus which assures essentially complete decomposition of the hydrocarbon based materials; the provision of such a method and apparatus which does not require substantial power from an external source; the provision of such a method and apparatus which are highly reliable and which are relatively simple and inexpensive. Other objects and features will be in part apparent and in part pointed out hereinafter.

SUMMARY OF THE INVENTION

An important aspect of the present invention is that it uses a plasma torch which operates on hydrogen rather than on one or more conventional inert gases. The torch gas is devoid of oxygen. The decomposition of the hydrocarbon based material in such a plasma generates an increased quantity of hydrogen and at least a portion of this hydrogen, in either pure form or as a mixture of hydrogen and alkenanes, such as ethane or methane, is utilized as a fuel to generate the electricity which powers the plasma torch. Another portion is used as the torch gas.

In the method of the present invention, the plasma is generated by an electric discharge in a flow of hydrogen. A hydrocarbon to be destroyed is injected into the plasma thereby to decompose the hydrocarbon and to produce increased hydrogen gas and also carbon particles in the flow. The carbon particles are then separated from the flow and at least a portion of the increased hydrogen is combined with atmospheric oxygen to generate electric current, the electric current being applied to generate the plasma. Preferably, a portion of the increased hydrogen is compressed and provided as the hydrogen supply to the plasma generation.

In the case of hydrocarbon materials containing chlorine which produce hydrogen chloride, an alkali scrubber is applied to the exhaust flow to extract the resultant hydrochloric acid and convert it to sodium chloride.

In accordance with a still further aspect, the method of the present invention generates a carbon of exceptional purity so that the method is useful for the production of such carbon quite apart from the destruction of hazardous hydrocarbon based materials.

BRIEF DESCRIPTION OF THE DRAWINGS

Corresponding reference characters indicate corresponding parts througout the several view of the drawings.

DESCRIPTION OF THE PREFERRED EMBODIMENT

Figure 1:
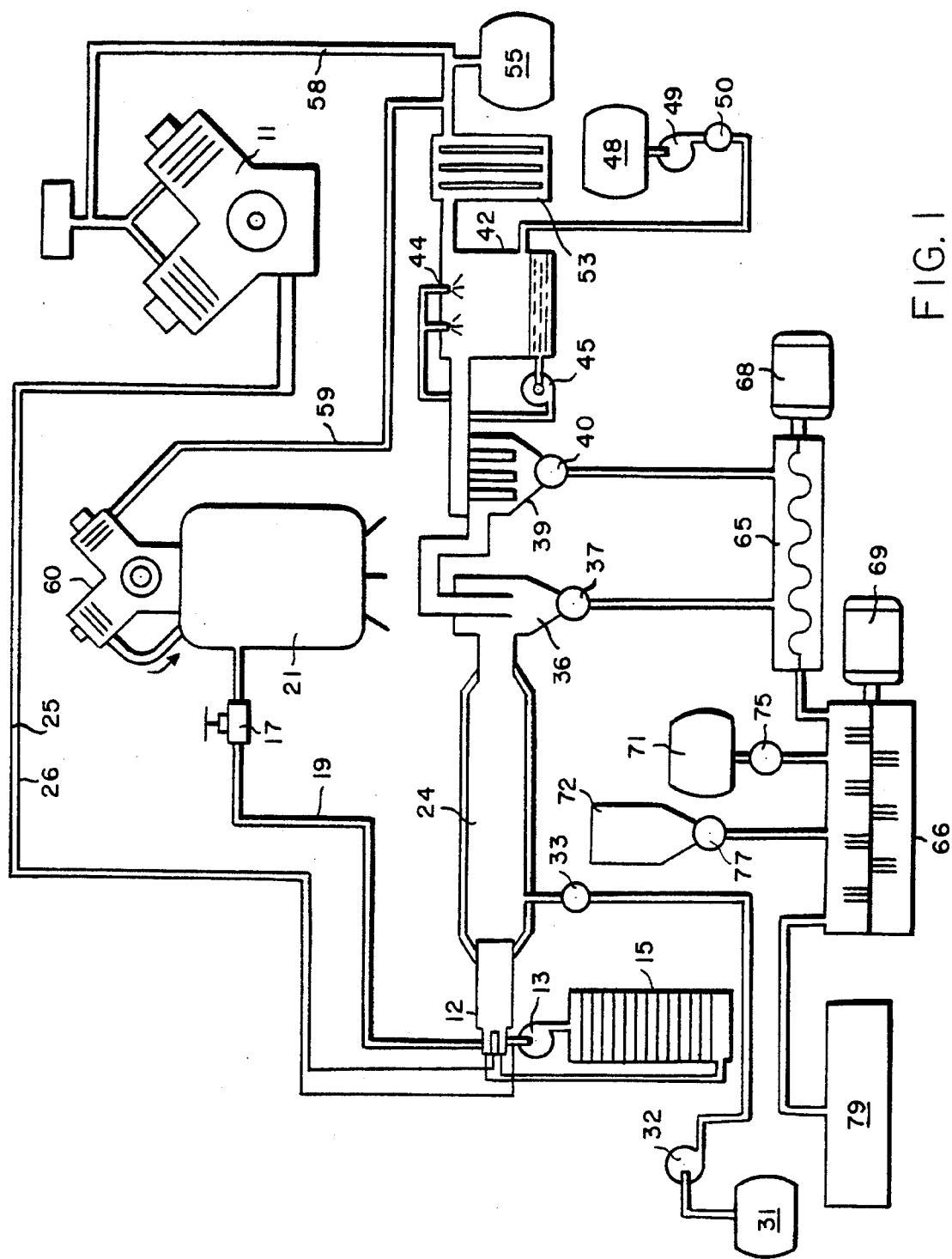
FIG. 1 is a schematic diagram of system for the destruction of hydrocarbon based materials in accordance with the present invention.

As indicated previously, the method of the present invention employs a plasma torch for generating the high temperatures appropriate for destroying hydrocarbon based materials. Such a torch is indicated generally by reference character 12 in FIG. 1. The torch itself is water cooled as is conventional and a pump 13 is provided for circulating coolant through the torch and through a radiator 15. As indicated previously, the torch 12 is operated on hydrogen and hydrogen gas under pressure is provided to the torch through a valve 17 and supply line 19 from a tank 21.

As is understood by those skilled in the art, a plasma torch requires a substantial amount of electrical power to operate. The system of FIG. 1 includes a d.c. motor generator 11 for generating that electrical power. In the particular embodiment illustrated, the motor powering the d.c. generator is an internal combustion engine converted for operation on gaseous fuel, e.g., hydrogen, in the steady state operation of the system illustrated. It should be understood that provision may be provided for switching over to an alternate fuel, such as propane, to facilitate initial starting. The engine operates by combining the gaseous fuel with atmospheric oxygen thereby to generate the kinetic energy which drives the d.c. generator powering torch 12 through supply leads 25 and 26.

While the motor generator illustrated provides a relatively simple and straightforward mechanism for combining hydrogen and atmospheric oxygen to obtain electricity, it should be understood that other systems might also be used. A Sterling engine or a turbine engine might also be used. Also, a fuel cell would be a highly efficient way of utilizing hydrogen as a fuel.

Figure 2:
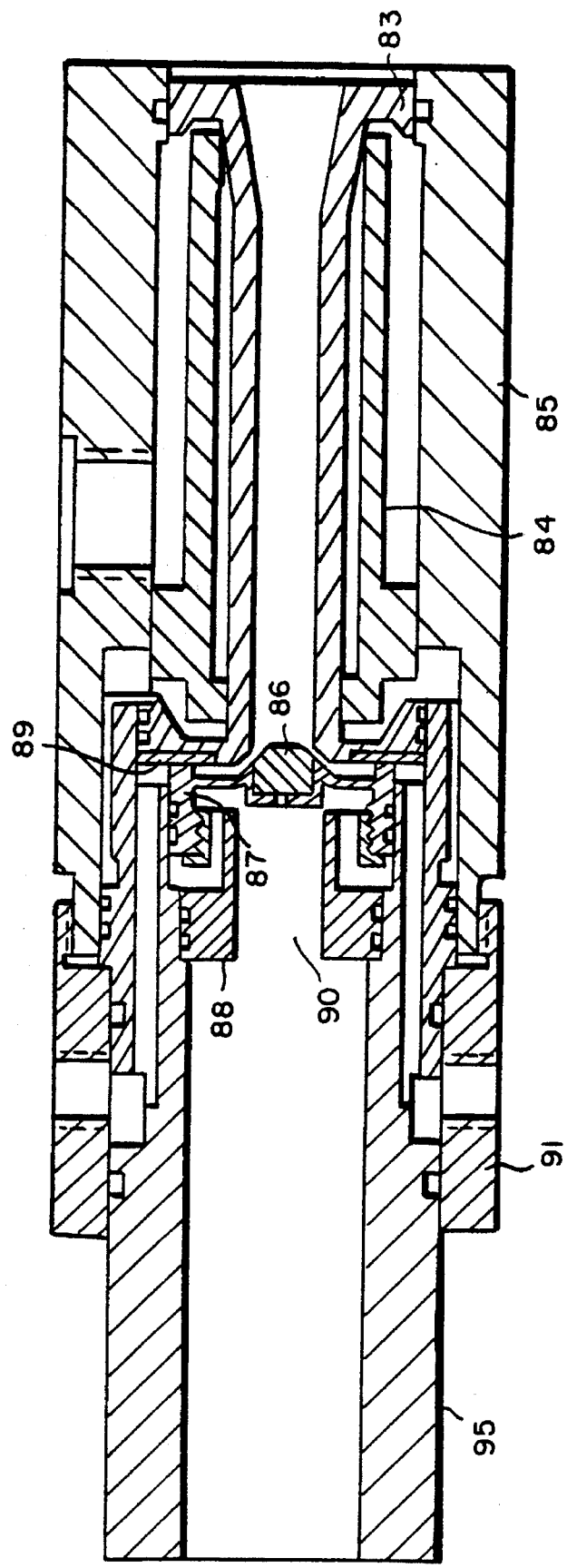
FIG. 2 is a side view in section of a plasma torch employed in the apparatus of FIG. 1.

The torch 12 is of an essentially conventional non-transferred arc type of design and is illustrated in greater detail in FIG. 2.

The electrical discharge takes place between a copper nozzle 83 which acts as an anode and a cathode which comprises a copper electrode 87 with a tungsten insert 86. The nozzle is mounted in a front torch body member 85 and a water diffuser 84 is provided for increasing the speed of flow of cooling water around the nozzle. Cooling water admitted at the rear of the cathode passes through lateral channels (not shown) to the spaces around the anode. An insulator 89 is interposed between the anode and the cathode. The copper electrode 87 has a peripheral rim which includes angled ports (not shown) to admit the plasma gas into the space between the anode and the cathode in a swirling manner as is conventional. The gas, hydrogen, is admitted through channels in a rear body member 95 which is clamped to the front body member 85 by an annular ring 91 which threads out to the front body member. A torch of the design illustrated can be operated at a power level of about 160 kilowatts, e.g., 400 amperes at 400 volts, and will generate temperatures well over 2000° Fahrenheit. Such temperatures will decompose hydrocarbons into their constituent elements.

Plasma generated by the torch 12 is projected into a reaction chamber 24. A liquid waste material to be decomposed is drawn from a tank 31 by a pump 32 and is injected, through a metering valve 33, into the reaction chamber 24 close to the torch, i.e., into the upstream portion of the reaction chamber.

Figure 3:
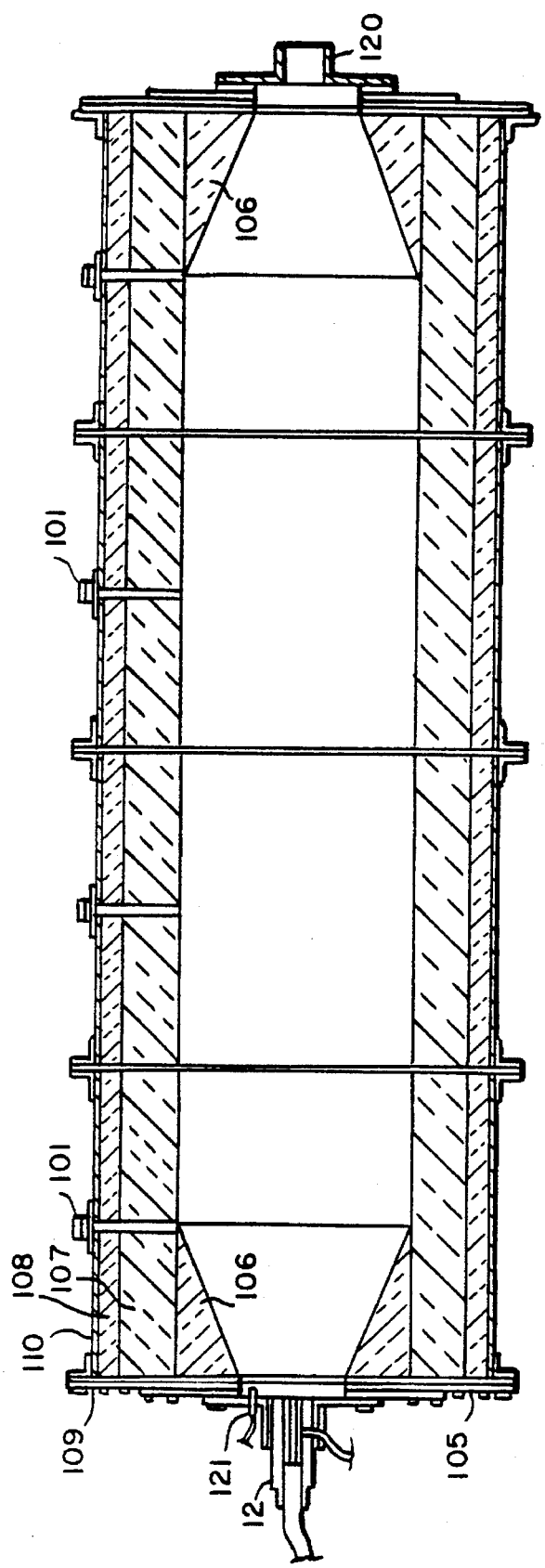
FIG. 3 is a side view in section of a reaction chamber employed in the apparatus of FIG. 1.

The construction of the reaction chamber 24 is illustrated in greater detail in FIG. 3. The reaction chamber is made up of a succession of similar sections which are assembled to provide an appropriate inside volume. Each section comprises a steel shell 110 which is flanged at each end to permit the sections to be bolted together. A layered ceramic insulation is built up on the inside of each section.

A layer of fibrous alumina paper 109 is provided next to the steel shell to absorb differential expansion. Next is a two inch thick layer 108 of a ceramic insulator which is a mixture of about 65% aluminum oxide and 35% silicon oxide. A suitable material is that designated as Greencast 45 L manufactured by the A. P. Green Co. of Mexico, Mo. Inside the layer 108 is a layer 107 which comprises 4 inches of a ceramic insulator material comprising mainly aluminum oxide with a substantially smaller quantity (0.1 to 0.3%) of silicon oxide. A suitable material is Greencast 97 L available from the A. P. Green Co. The avoidance of substantial silicon oxide in the innermost layer minimizes contamination of the high purity low ash carbon which can be produced by the method of the present invention, as described in greater detail hereinafter.

Each of the reaction chamber sections is provided with a thermocouple well 101 which facilitates the monitoring of temperature along the reaction chamber. The ends of the reaction chamber are closed by cover plates 105 with appropriate gaskets. The plasma torch 12 is mounted at the input end of the reaction chamber as illustrated and an outlet port 120 is mounted at the other end. The sections at the ends of the reaction chamber are also provided with ceramic cones 106, as illustrated, to protect the end plates and to guide the flow of hot gases. These cones 106 may also be made from Greencast 97 L. The port or nozzle through which hydrocarbon waste material is injected into the reaction chamber close to the torch is indicated by reference character 121.

Referring again to FIG. 1, the outlet port 120 from the reaction chamber 24 is connected to a cyclone separator 36 which extracts carbon particles from the exhaust flow. While the cyclone separator will remove some of the carbon particles, the outlet of the cyclone separator is connected to a baghouse type filter assembly 39 where remaining particles are extracted from the gas flow. The bottom of the cyclone separator is provided with an airlock valve 37 which permits accumulated carbon to be periodically dumped from the cyclone separator without admitting ambient atmosphere into the reaction chamber. The baghouse filter 39 is likewise provided with an airlock valve 40 for periodically removing accumulated carbon particles.

In the case of hydrocarbon based materials which include PCBs, the exhaust products from the reaction chamber 24 will also typically include hydrogen chloride gas. To remove such reactive materials, the outlet of the baghouse filter assembly 39 is connected to a caustic scrubber designated generally by reference character 42. As is conventional, the caustic scrubber 42 includes a recirculating water spray 44 driven by a pump 45 together with a metered supply of alkali which is drawn from a tank 48 by a pump 49 and through a metering valve 50. To remove any further impurities, the outlet of the caustic scrubber 44 is connected to a carbon filter assembly designated generally by reference character 53. As will be understood, other types of scrubbers might also be used depending on the presence of other elements in the hydrocarbon materials being decomposed. To insure that the exhaust gas has been appropriately purified, a gas analysis system is preferably tapped into the flow at this point, as indicated by reference character 55.

As indicated previously, the decomposition of the hydrocarbon waste material creates additional hydrogen gas in the exhaust flow from the reaction chamber 24. A portion of this additional hydrogen gas is fed as fuel to the motor generator 11 through a supply line 58. Another portion of the purified hydrogen gas is fed through a supply line 59 to a compressor 60 which maintains the supply of hydrogen gas under pressure in tank 21.

In general, the additional hydrogen gas generated by the decomposition of hydrocarbon materials will be sufficient to provide most of the fuel needed by the motor generator 60. Any excess may be easily tapped off and burned or sold. Any shortfall may be made up by supplying propane to the motor generator. In steady state operation, the system is essentially energy self sufficient.

It is a significant aspect of the present invention that oxygen and nitrogen are essentially excluded from the pyrolytic process. The presence of oxygen, as proposed in some prior art plasma based pyrolytic systems, could lead to the production of dioxens and dibenzofurans. Likewise, under some circumstances, the presence of nitrogen could lead to the production of hydrogen cyanide. In addition to avoidance of these dangerous compounds, the process of the present invention avoids the production of large quantities of $CO_2$ as would occur in most combustion type technologies.

As indicated previously, the method of the present invention produces carbon of exceptionally high purity which has commercial value apart from the destruction of the hazardous hydrocarbon based waste materials. To facilitate the utilization of this carbon product the system illustrated in FIG. 1 includes an essentially conventional pelletizing system. Carbon particles extracted through the air lock valves 37 and 40 are fed, by a screw transporter 65 into a mixer 66. The screw transporter 65 and mixer 66 are provided with suitable driving motors 68 and 69, as indicated. Water from a tank 71 and binder from a tank 72 are metered into the mixer through respective valves 75 and 77. The mixture is then fed to a pelletizer 79.

A particular feature of the carbon produced by the present invention is that, with suitable starting materials or feedstock, it contains very low ash as compared with carbon conventionally produced from coal or coconut shells. Low ash carbon is particularly useful as a substrate material for platinum in catalytic converters. It is also useful in active carbon filters for recycling solvents. Suitable starting materials to produce low ash carbon are transformer oil (which is inherently low ash) or used motor oil which has been centrifuged or otherwise treated to remove metallic contaminants which would produce ash.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A method of destroying liquid hydrocarbon materials by pyrolysis; said method comprising:
   generating a plasma from an electric arc discharge in a flow of hydrogen gas devoid of oxygen;
   injecting said liquid hydrocarbon material into said plasma thereby to pyrolytically decompose said hydrocarbon material and produce increased hydrogen gas and carbon particles in said gas flow;
   separating said carbon particles from said gas flow; and
   combining at least a portion of said increased hydrogen with atmospheric oxygen to generate electric current, said current being applied to generate said plasma.

2. A method as set forth in claim 1 further comprising compressing a portion of said increased hydrogen gas and providing said compressed hydrogen gas to said plasma generating step.

3. A method of destroying liquid hydrocarbon materials by pyrolysis; said method comprising:
   in a plasma arc torch, generating a plasma from an electric arc discharge in a flow of hydrogen gas devoid of oxygen;
   injecting said liquid hydrocarbon material into said plasma thereby to decompose said hydrocarbon material and produce increased hydrogen gas and carbon particles in said gas flow;
   separating said carbon particles from said gas flow; and
   compressing a portion of said increased hydrogen gas and providing said compressed hydrogen gas to said plasma generating step.

4. A method as set forth in claim 3 wherein said flow of hydrogen is also essentially devoid of nitrogen.

5. A method of producing carbon, said method comprising:
   providing a supply of liquid hydrocarbon material;
   providing, by electric arc discharge in a hydrogen gas atmosphere devoid of oxygen, a heated region of temperature greater than 2000° F;
   injecting said liquid hydrocarbon material into said region thereby to pyrolytically decompose said hydrocarbon material into hydrogen gas and carbon particles; and
   separating the carbon particles thereby created from the increased hydrogen gas thereby created.

6. A method as set forth in claim 5 wherein said hydrogen atmosphere is substantially devoid of oxygen.

7. A method as set forth in claim 6 wherein said hydrogen atmosphere is substantially devoid of nitrogen.

8. A method of producing carbon; said method comprising:
   generating a plasma from an electric arc discharge in a flow of hydrogen devoid of oxygen;
   injecting a liquid hydrocarbon material into said plasma thereby to pyrolytically decompose said hydrocarbon material and produce increased hydrogen gas and carbon particles in said flow; and
   separating said carbon from said gas flow.

9. A method as set forth in claim 8 further comprising combining at least a portion of said increased hydrogen gas with atmospheric oxygen to generate electric current, said current being applied to generate said plasma.

10. A method as set forth in claim 8 further comprising compressing a portion of said increased hydrogen gas to provide said flow of hydrogen in said plasma generating step.

11. A method as set forth in claim 8 wherein said hydrocarbon comprises used transformer oil.

\* \* \* \* \*